(12) United States Patent
Yeh et al.

(10) Patent No.: US 10,571,969 B2
(45) Date of Patent: Feb. 25, 2020

(54) ROLLABLE DISPLAY DEVICE

(71) Applicant: SYNCMOLD ENTERPRISE CORP., New Taipei (TW)

(72) Inventors: Chien-Cheng Yeh, New Taipei (TW); Ching-Hui Yen, New Taipei (TW)

(73) Assignee: SYNCMOLD ENTERPRISE CORP., New Taipei (TW)

(*) Notice: Subject to any disclaimer, the term of this patent is extended or adjusted under 35 U.S.C. 154(b) by 0 days.

(21) Appl. No.: 16/272,126

(22) Filed: Feb. 11, 2019

(65) Prior Publication Data
US 2019/0278335 A1 Sep. 12, 2019

Related U.S. Application Data

(60) Provisional application No. 62/640,897, filed on Mar. 9, 2018.

(30) Foreign Application Priority Data

Nov. 15, 2018 (TW) ............................ 107215504 U

(51) Int. Cl.
*G06F 1/16* (2006.01)
*H05K 5/00* (2006.01)
*G09F 9/30* (2006.01)
*G09F 11/00* (2006.01)

(52) U.S. Cl.
CPC ............ *G06F 1/1652* (2013.01); *G09F 9/301* (2013.01); *H05K 5/0017* (2013.01); *G09F 2011/0009* (2013.01)

(58) Field of Classification Search
CPC ...... G06F 1/1652; G09F 9/301; H05K 5/0017
See application file for complete search history.

(56) References Cited

U.S. PATENT DOCUMENTS

| | | | | |
|---|---|---|---|---|
| 9,098,241 B1* | 8/2015 | Cho | ...................... | H05K 1/028 |
| 9,519,313 B2* | 12/2016 | Kim | ...................... | G06F 1/166 |
| 9,625,946 B2* | 4/2017 | Lee | ...................... | G06F 1/1652 |
| 9,756,757 B2* | 9/2017 | Park | ...................... | G09F 9/301 |
| 9,823,700 B2* | 11/2017 | Lee | ...................... | G06F 1/1652 |
| 10,013,955 B2* | 7/2018 | Oh | ...................... | G06F 1/1626 |
| 10,111,344 B2* | 10/2018 | Han | ...................... | H05K 1/028 |
| 10,146,260 B2* | 12/2018 | Lee | ...................... | G06F 1/1652 |
| 10,314,183 B2* | 6/2019 | Heo | ...................... | H05K 1/028 |
| 10,362,690 B2* | 7/2019 | Han | ...................... | G02F 1/1333 |
| 2005/0040962 A1* | 2/2005 | Funkhouser | ......... | G06F 1/1601 340/815.4 |
| 2007/0180745 A1* | 8/2007 | Ofuji | ...................... | G03B 21/58 40/601 |
| 2008/0198541 A1* | 8/2008 | Lin | ...................... | G06F 1/1615 361/679.05 |
| 2012/0002357 A1* | 1/2012 | Auld | ...................... | G09F 9/33 361/679.01 |

(Continued)

*Primary Examiner* — Hoa C Nguyen
*Assistant Examiner* — Keith DePew
(74) *Attorney, Agent, or Firm* — Muncy, Geissler, Olds & Lowe, PC

(57) ABSTRACT

The rollable display device of the present invention includes a base, a cover, a rolling module, a display screen, an actuating unit and a supporting unit. When an external force is applied on the cover to switch the display screen from a retracting state into an expanding state, the display screen rolled on the rolling module would expand out of the base.

19 Claims, 13 Drawing Sheets

(56) References Cited

U.S. PATENT DOCUMENTS

| | | | |
|---|---|---|---|
| 2013/0016497 A1* | 1/2013 | Anderson | G09F 9/301 |
| | | | 362/97.1 |
| 2014/0268532 A1* | 9/2014 | Nicol | G09F 9/301 |
| | | | 361/679.26 |
| 2016/0231843 A1* | 8/2016 | Kim | G06F 3/0412 |
| 2016/0353588 A1* | 12/2016 | Kim | G09F 9/301 |
| 2016/0363960 A1* | 12/2016 | Park | G06F 1/1656 |
| 2016/0374228 A1* | 12/2016 | Park | G09F 9/301 |
| 2017/0013705 A1* | 1/2017 | Jahng | F21V 33/0052 |
| 2017/0013726 A1* | 1/2017 | Han | H05K 1/028 |
| 2017/0023978 A1* | 1/2017 | Cho | H04M 1/0268 |
| 2017/0156219 A1* | 6/2017 | Heo | G02F 1/133305 |
| 2017/0278436 A1* | 9/2017 | Chu | G09F 9/30 |
| 2017/0318689 A1* | 11/2017 | Kim | G03B 21/58 |
| 2017/0325343 A1* | 11/2017 | Seo | G03B 21/58 |
| 2017/0373269 A1* | 12/2017 | Seo | H05K 7/20954 |
| 2018/0359869 A1* | 12/2018 | Kim | H05K 5/0017 |
| 2019/0029131 A1* | 1/2019 | Han | H05K 1/028 |
| 2019/0037710 A1* | 1/2019 | Han | G02F 1/1333 |
| 2019/0098774 A1* | 3/2019 | Park | H05K 5/0217 |
| 2019/0138058 A1* | 5/2019 | Kwon | G06F 1/1652 |
| 2019/0150300 A1* | 5/2019 | Kim | H05K 5/0017 |
| | | | 361/807 |

* cited by examiner

ROLLABLE DISPLAY DEVICE

CROSS REFERENCE TO RELATED APPLICATION

This application claims benefit of U.S. Provisional Application Ser. No. 62/640,897, filed on Mar. 9, 2018, and the benefit of Taiwan Patent Application Serial No. 107215504 filed on Nov. 15, 2018. The entirety of each said application is incorporated herein by reference.

BACKGROUND OF THE INVENTION

1. Field of the Invention

The present invention relates to a rollable display device and, more particularly, to a display device having a switchable display screen between a retracting state and an expanding state.

2. Description of Related Art

For conventional rollable display devices, because no housing provides protection, the falling of the devices due to hitting or shaking would result in poor durability and high maintenance cost. Additionally, in order to maintain the expanding state for a long time, the conventional display devices need to be supported by user's hands or supporting members, resulting in inconvenience in use.

In view of the foregoing drawbacks, the present invention provides a rollable display device which can be feely rolled into a cylinder shape when not in use and can be expanded when necessary to make its display screen stably remain on the expanding state.

SUMMARY OF THE INVENTION

In accordance with the foregoing objective, the present invention provides a rollable display device, which comprises: a base, including a tubular body and a receiving tank, wherein the tubular body has a receiving space and a slot; a cover, being detachably disposed on the base; a rolling module, being disposed within the receiving space; a display screen, being partially rolled on the rolling module and having one end fixed on the rolling module and the other end passing through the slot and fixed on the cover; an actuating unit, being disposed in the receiving tank; and a supporting unit, having one end slidably disposed at the actuating module and the other end capable of moving synchronously with the cover, wherein (i) the display screen can be switched between a retracting state (i.e. rolled state) and an expanding state (unrolled state), (ii) in the retracting state, the cover contacts the base, and the display screen is rolled and received in the receiving space, and (iii) in the expanding state, the cover is separated from the base, and the other end of the display screen is located away from the base to make the display screen partially expand out of the base.

In the present invention, the supporting unit includes a first rod and a second rod. The first rod has a first liftable end and a first slidable end, whereas the second rod has a second liftable end and a second slidable end. The first liftable end and the second liftable end are fixed to the cover and capable of moving with the cover. The first slidable end and the second slidable end are slidably disposed at the actuating unit. In the expanding state, the first rod and the second rod intersect with each other at a junction. When the display screen is switched into the expanding state from the retracting state, the junction between the first rod and the second rod moves away from the base.

In the present invention, the base further includes a back plate. The back plate and the tubular body define the receiving tank. When the display screen is in the retracting state, the first rod and the second rod of the supporting unit are received in the receiving tank.

In the present invention, the rolling module includes a shell, a shaft, a torsion spring and a rotating element. The display screen is partially rolled on the shell. The shaft extends through the shell. The torsion spring and the rotating element are sleeved on the shaft. The torsion spring has one end connected to the rotating element and the other end connected to one end of the shaft. The rotating element is connected to an inner surface of the shell, so that the shell is capable of moving with the rotating element. Accordingly, when an external force is applied on the cover, the shell of the rolling module is brought into rotary motion by a portion of the display screen, resulting in rotation of the rotating element, so that the torsion spring provides a torsion constantly. On the contrary, when the display screen is switched into the retracting state from the expanding state, the torsion spring of the rolling module provides the torsion on the rotating element to rotate the shell, so that the display screen is wound on the shell.

In accordance with one embodiment of the present invention, the actuating unit includes a first trough and a second trough. When the display screen is switched into the expanding state from the retracting state, the first liftable end of the first rod and the second liftable end of the second rod moves away from the receiving tank synchronously with the cover, and the first slidable end and the second slidable end slide along the first trough and the second trough, respectively, and move towards each other. Each of the first trough and the second trough has a first section, a first convex section, a second convex section and a second section. The first section, the first convex section, the second convex section and the second section are integrally configured into a loop. When the display screen is in the retracting state, the first slidable end and the second slidable are located at the first sections of the first trough and the second trough, respectively. When an external force is applied to lift the cover away from the base and to switch the display screen into the expanding state from the retracting state, the first slidable end and the second slidable end slide into the first convex section from the first section and stop at a joint between the first convex section and the second convex section. On the contrary, the display screen can be switched into the retracting state from the expanding state by applying an external force to lift the cover away from the base so as to force the first slidable end the second slidable end to slide through the second convex section, followed by removal of the external force to make the first slidable end the second slidable end slide through the second section and the first section in sequence and stop at the first section. Preferably, the first convex section has a first linear segment and a second linear segment, whereas the second convex section has a third linear segment and a fourth linear segment. The first linear segment and the second linear segment define a first angle; the third linear segment and the fourth linear segment define a second angle; and the second linear segment and the third linear segment define a third angle. The first angle, the second angle and the third angle are 90 degrees or less.

In accordance with another embodiment of the present invention, the actuating unit includes an elastic element, a third trough and a fourth trough. The first slidable end and the second slidable end are fixed to two ends of the elastic element, respectively. The first slidable end is slidably disposed at the third trough, whereas the second slidable end is slidably disposed at the fourth trough. The third trough and the fourth trough are linear troughs.

In accordance with yet another embodiment of the present invention, the actuating unit includes a plurality of elastic elements, a third trough and a fourth trough. One of the elastic elements is disposed between the cover and the first rod, whereas another of the elastic elements is disposed between the cover and the second rod. The first slidable end is slidably disposed at the third trough, and the second slidable end is slidably disposed at the fourth trough. The third trough and the fourth trough are linear troughs.

In accordance with further another embodiment of the present invention, the actuating unit includes a first threaded shaft and a second threaded shaft. The first slidable end has a first slider sleeved on the first threaded shaft, whereas the second slidable end has a second slider sleeved on the second threaded shaft.

The foregoing and other objects, advantages, and novel features of the invention will become more apparent from the following detailed description when taken in conjunction with the accompanying drawings.

DETAILED DESCRIPTION OF THE PREFERRED EMBODIMENT

Figure 1:
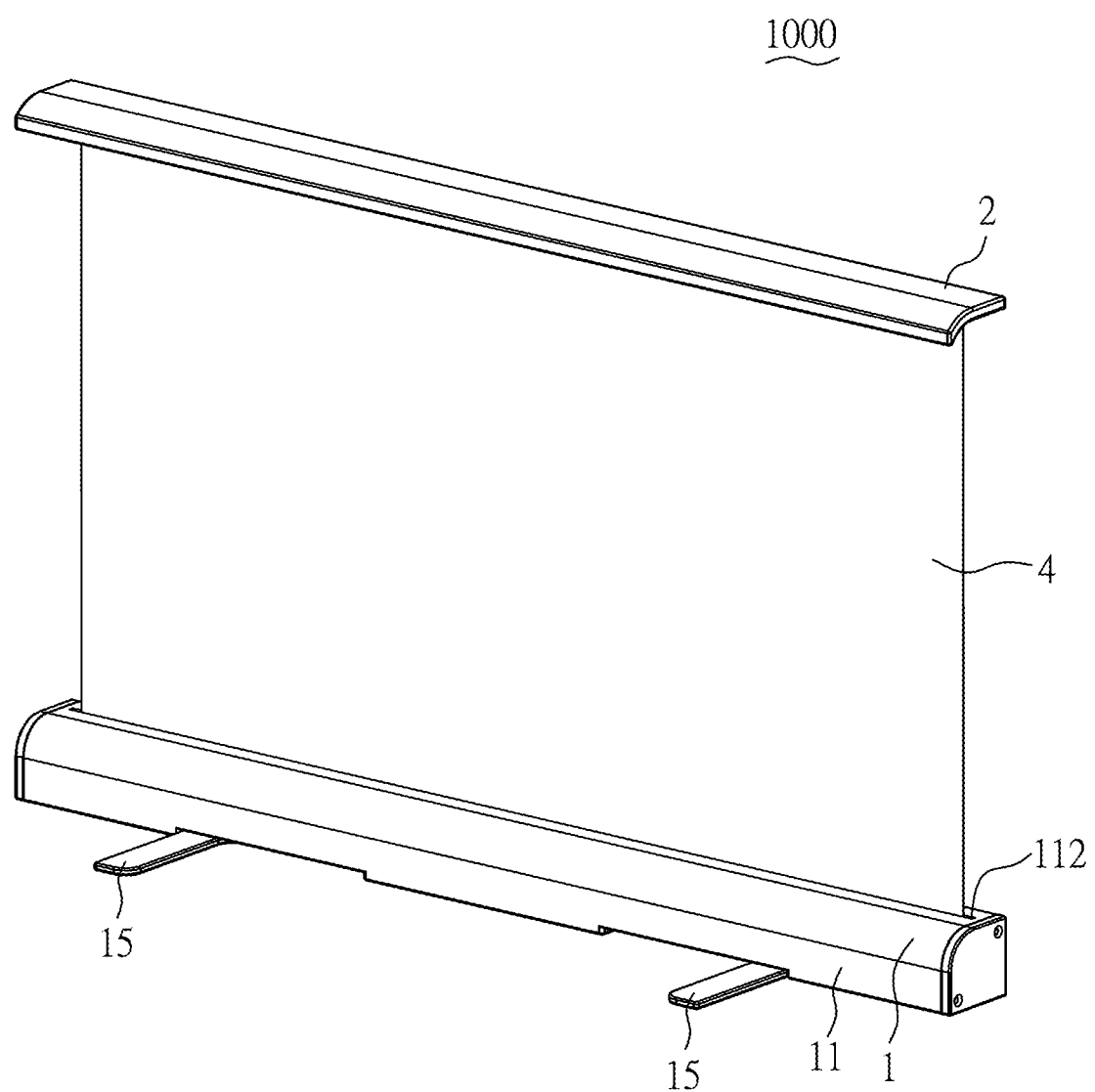
FIG. 1 is a front perspective view of a rollable display device in accordance with the present invention.
Figure 2:
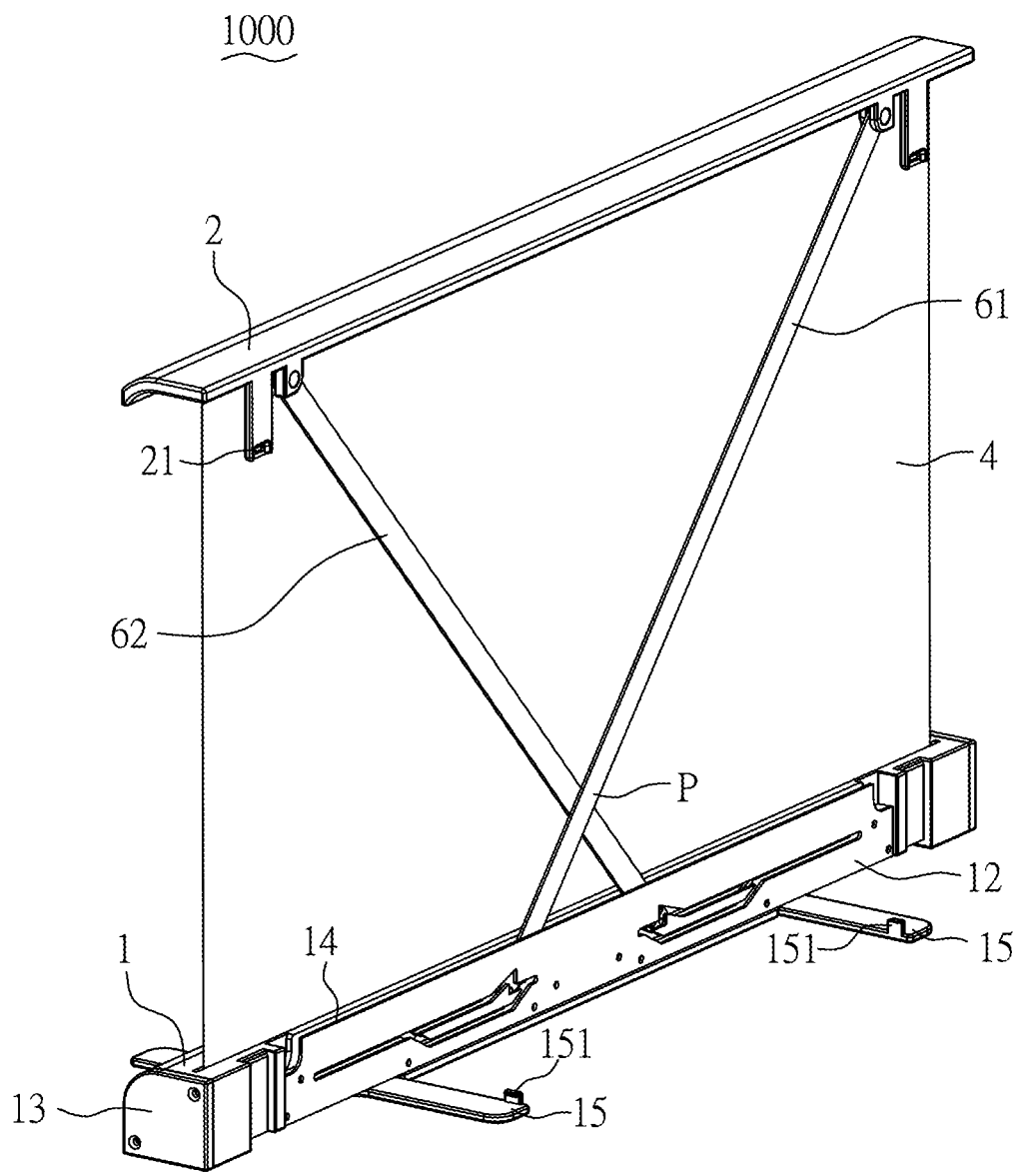
FIG. 2 is a rear perspective view of a rollable display device in accordance with the present invention.
Figure 3:
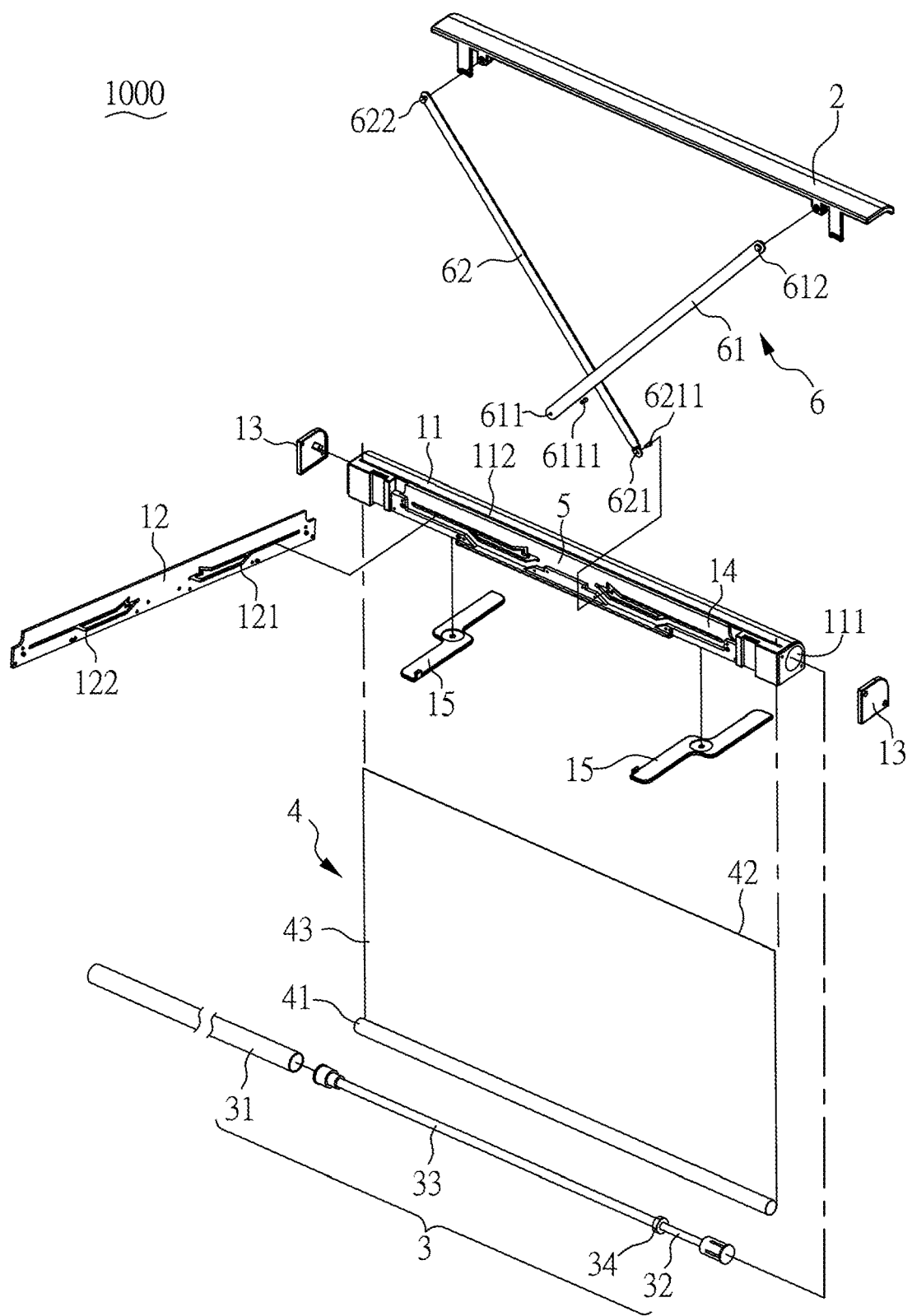
FIG. 3 is an exploded perspective view of a rollable display device in accordance with the present invention.
Figure 4:
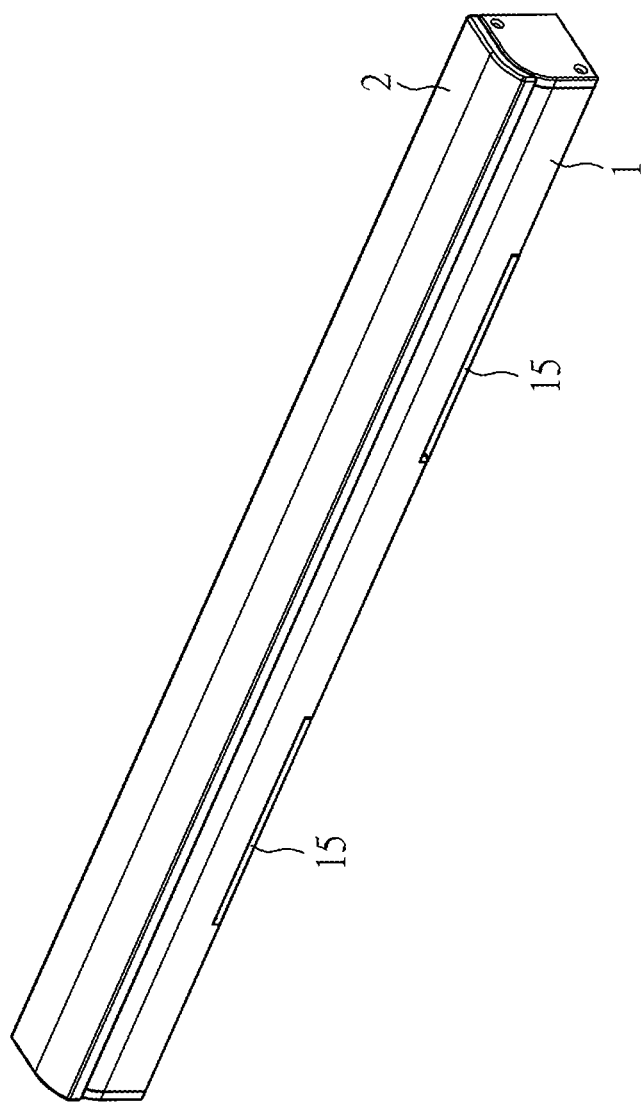
FIG. 4 is a perspective view for illustration of a retracting state of a rollable display device in accordance with the present invention.
Figure 5:
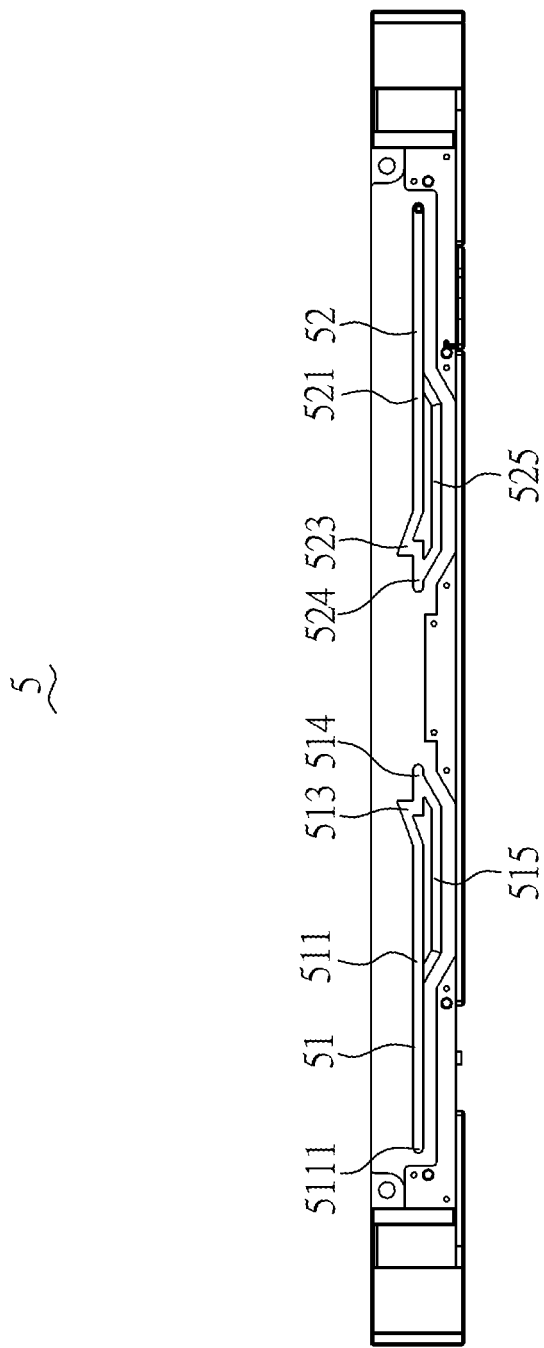
FIG. 5 is a schematic view of an actuating unit of a rollable display device in accordance with the present invention.

With reference to the front, rear and exploded perspective views of FIGS. 1, 2 and 3, respectively, the rollable display device 1000 of the present invention mainly includes a base 1, a cover 2, a rolling module 3, a display screen 4, an actuating unit 5 (as shown in FIG. 5) and a supporting unit 6. By virtue of the rolling module 3, the actuating unit 5 (as shown in FIG. 5) and the supporting unit 6, the display screen 4 can be switched between an expanding state (as shown in FIG. 1) and a retracting state (as shown in FIG. 4).

The base 1 includes a tubular body 11, a back plate 12, two lateral plates 13 and a receiving tank 14. The tubular body 11 has a receiving space 111 and a slot 112. The back plate 12 covers one side of the tubular body 11. The back plate 12 and the tubular body 11 define the receiving tank 14. The back plate 12 has a first groove 121 and a second groove 122 at its one side facing in the receiving tank 14. The lateral plates 13 covers two ends of the receiving space 111. The rolling module 3 and the display screen 4 are received in the receiving space 111. The slot 112 and the receiving space 111 communicate with each other. The cover 2 selectively covers the slot 112. The actuating unit 5 and the supporting unit 6 are received in the receiving tank 14.

In this embodiment, the cover 2 is illustrated as a plate and detachably disposed on the base 1 and connected with the display screen 4 and the supporting unit 6. When the rollable display device 1000 is in the retracting state as shown in FIG. 4, the cover 2 is located on the base 1 and covers the slot 112. When the rollable display device 1000 is in the expanding state as shown in FIGS. 1 and 2, the cover 2 is supported by the supporting unit 6 to be spaced from the base 1, so that the display screen 4 is expanded between the cover 2 and the base 1.

The rolling module 3 is disposed in the receiving space 111 and includes a shell 31, a shaft 32, a torsion spring 33 and a rotating element 34. The shell 31 is a hollow tube. The shaft 32 extends through the shell 31. The shaft 32 has two opposite ends fixed to the lateral plates 13 of the base 1. The torsion spring 33 and the rotating element 34 are sleeved on the shaft 32. The torsion spring 33 has one end connected to the rotating element 34 and the other end connected to one end of the shaft 32. The rotating element 34 is connected to an inner surface of the shell 31, and thus the rotary motion of the shell 31 can induce the rotating element 34 to rotate synchronously. Due to the rotation of the rotating element 34, one end of the torsion spring 33 would be twisted and the other end of the torsion spring 33 keeps stationary, so that the torsion spring 33 can provide torsion continuously.

The display screen 4 includes a first end 41, a second end 42 and a flexible display area 43. The first end 41 is fixed to the rolling module 3, whereas the second end 42 passes through the slot 112 to be fixed to the cover 2. When the rollable display device 1000 is in the retracting state as shown in FIG. 4, the display screen is in a rolled state. It means that the flexible display area 43 is wound on the shell 31 of the rolling module 3. When the rollable display device 1000 is in the expanding state as shown in FIG. 1, the display screen is in an unrolled state, and the second end 42 and the cover 2 are located apart from the base 1 to make the flexible display area 43 unwind from the rolling module 3 to form a display plane.

Figure 6:
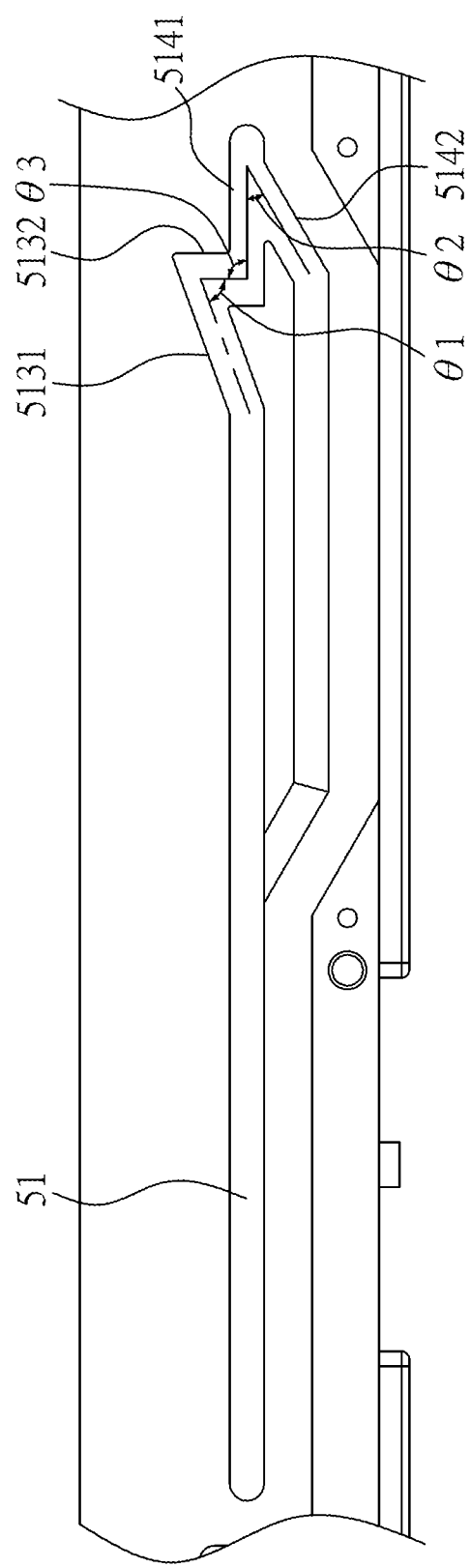
FIG. 6 is a partial schematic view of an actuating unit of a rollable display device in accordance with the present invention.

The actuating unit 5 is disposed in the receiving tank 14 and includes a first trough 51 and a second trough 52. The first trough 51 and the second trough 52 correspond to the first groove 121 and the second groove 122, respectively, to permit the supporting unit 6 to be slidably disposed between the actuating unit 5 and the back plate 12. As shown in FIG. 5, the first trough 51 and the second trough 52 are mirror-symmetric to each other. The first trough 51 has a first section 511, a first convex section 513, a second convex section 514 and a second section 515, which are integrally configured into a loop. Likewise, the second trough 52 has a first section 521, a first convex section 523, a second convex section 524 and a second section 525, which are integrally configured into another loop. As the first trough 51 and the second trough 52 are symmetric to each other, the detailed illustration is given only on the first trough 51 for purposes of brevity. Please refer to FIG. 6 for illustration of the first trough 51. The first convex section 513 has a first linear segment 5131 and a second linear segment 5132 adjacent to the first linear segment 5131. The first linear segment 5131 and the second linear segment 5132 define a first angle θ1. The second convex section 514 has a third linear segment 5141 and a fourth linear segment 5142 adjacent to the third linear segment 5141. The third linear segment 5141 and the fourth linear segment 5142 define a second angle θ2. Additionally, the second linear segment 5132 and the third linear segment 5141 define a second angle θ3. The first angle θ1, the second angle θ2 and the third angle θ3 are 90 degrees or less. Symmetrically, the second trough 52 also has a first linear segment, a second linear segment, a third segment, a fourth segment, a first angle, a second angle and a third angle. As the second trough 52 is symmetric to the first trough 51, the same description need not be repeated.

Further, please referring to FIG. 3, the supporting unit 6 includes a first rod 61 and a second rod 62. The first rod 61 has a first slidable end 611 and a first liftable end 612, whereas the second rod 62 has a second slidable end 621 and a second liftable end 622. The first rod 61 and the second rod 62 intersect with each other. The first slidable end 611 has a first slider 6111 slidably disposed between the first trough 51 and the first groove 121, whereas the first liftable end 612 is fixed to the cover 2. The second slidable end 621 has a second slider 6211 slidably disposed between the second trough 52 and the second groove 122, whereas the second liftable end 622 is fixed to the cover 2. The first liftable end 612 and the second liftable end 622 are capable of moving synchronously with the cover 2. In the retracting state as shown in FIG. 4, the first rod 61 and the second rod 62 are received in the receiving tank 14. When the cover 2 is forced to gradually move apart from the base 1 and reach the expanding state as shown in FIG. 1, the first liftable end 612 and the second liftable end 622 move along with the cover 2 to be apart from the receiving tank 14.

In detail, when an external force is applied on the cover 2 to switch the display screen 4 from the retracting state as shown in FIG. 4 to the expanding state as shown in FIGS. 1 and 2, the second end 42 of the display screen 4 as well as the first liftable end 612 and the second liftable end 622 of the supporting unit 6 would gradually move apart from the base 1 synchronously with the cover 2. In the meanwhile, the junction P (as shown in FIG. 2), at which the first rod 61 and the second rod 62 intersect with each other, moves away from the base 1.

Figure 7:
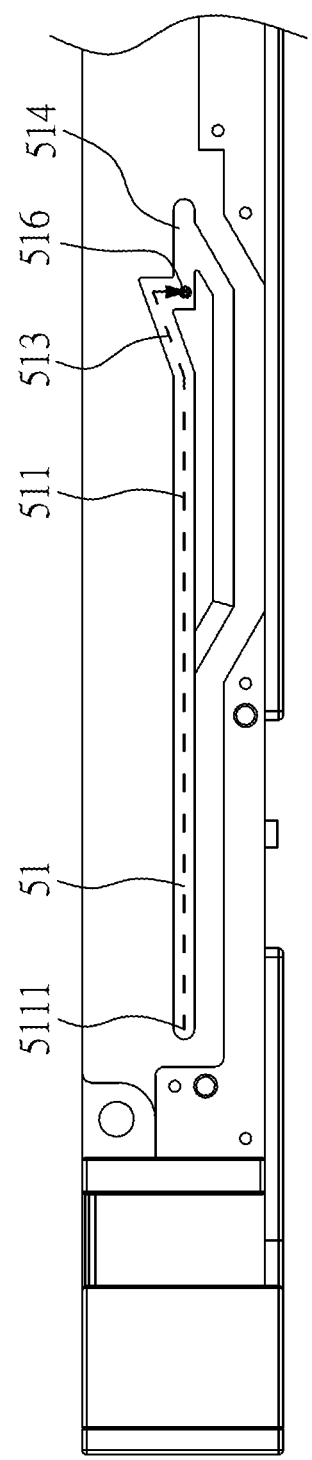
FIG. 7 is a schematic view for illustration of the sliding route by which the first slidable end of the first rod slides along the first trough to switch into the expanding state in accordance with the present invention.
Figure 8:
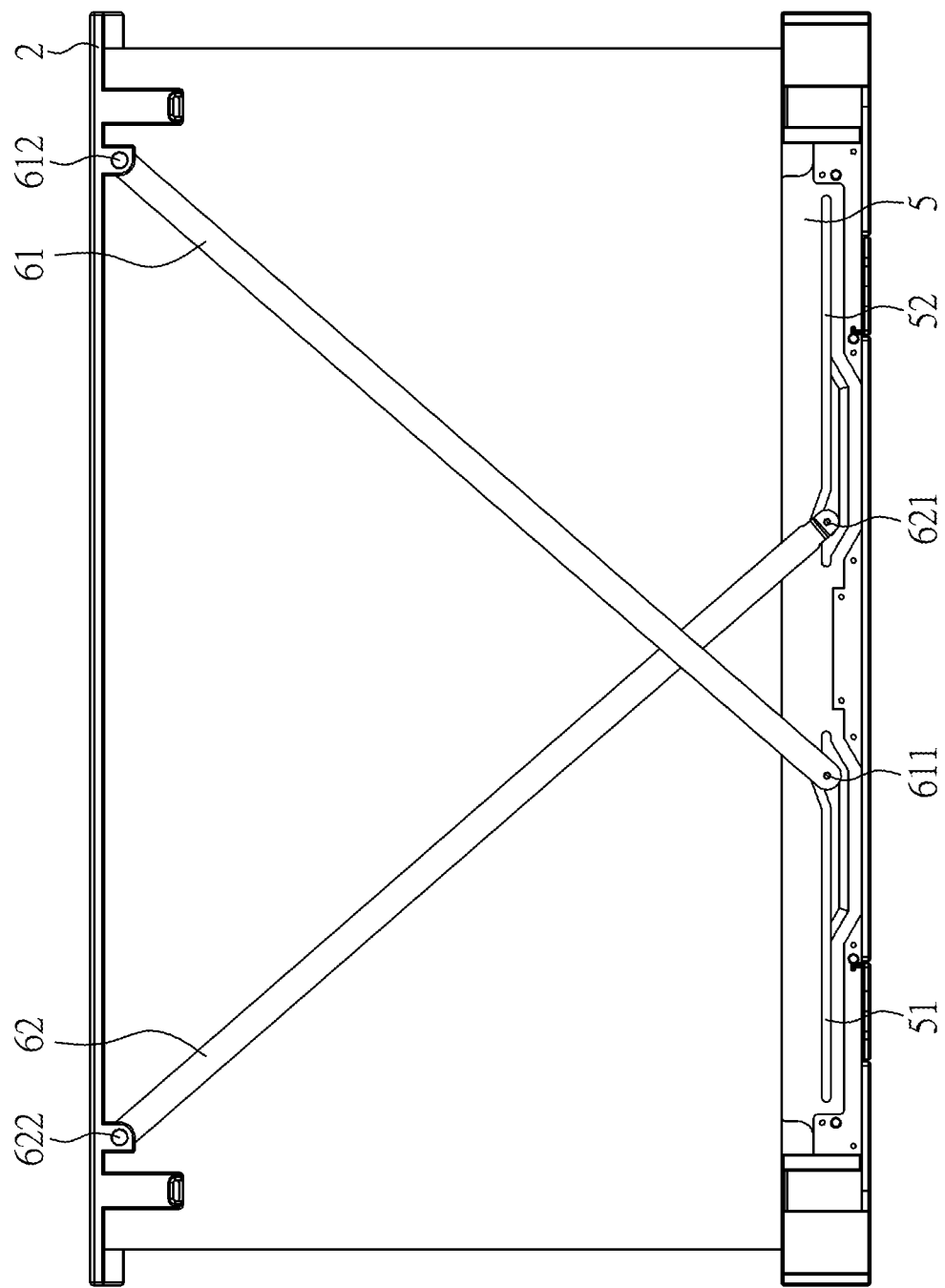
FIG. 8 is a perspective view for illustration of an expanding state of a rollable display device in accordance with the present invention.

During the operation, the first slidable end 611 and the second slidable end 621 of the supporting unit 6 slide between the first trough 51 and the first groove 121 and between the second trough 52 and the second groove 122, respectively. Please refer to FIG. 7, which shows the sliding route of the first slidable end 611 along the first trough 51. As the sliding route of the second slidable end 621 along the second trough 52 is mirror-symmetric to that of the first slidable end 611, the same description need not be repeated. When the rollable display device 1000 is in the retracting state, the first slidable end 611 is located at one terminal part 5111 of the first section 511. When it is gradually switched to the expanding state, the first slidable end 611 slides towards the first convex section 513 from the terminal part 5111 of the first section 511, enters the first convex section 513, and finally stops at a joint 516 between the first convex section 513 and the second convex section 514 so that the rollable display device 1000 reaches the expanding state. Meanwhile, the second slidable end 621 of the second rod 62 is also located at a joint (not shown in the figure) of the second trough 52. As a result, as shown in FIG. 8, the display screen 4 is supported by the supporting unit 6 and maintains the expanding state.

That is, when the rollable display device 1000 is gradually switched into the expanding state, the flexible display area 43 is unrolled about the shell 31 of the rolling module 3, resulting in synchronous rotation of the shell 31 and the rotating element 34, so that the torsion spring 33 can provide torsion continuously. As the supporting force provided by the first rod 61 and the second rod 62 of the supporting unit 6 intersecting with each other can balance with the torsion from the torsion spring 33, the display screen 4 would maintain the expanding state.

Figure 9:
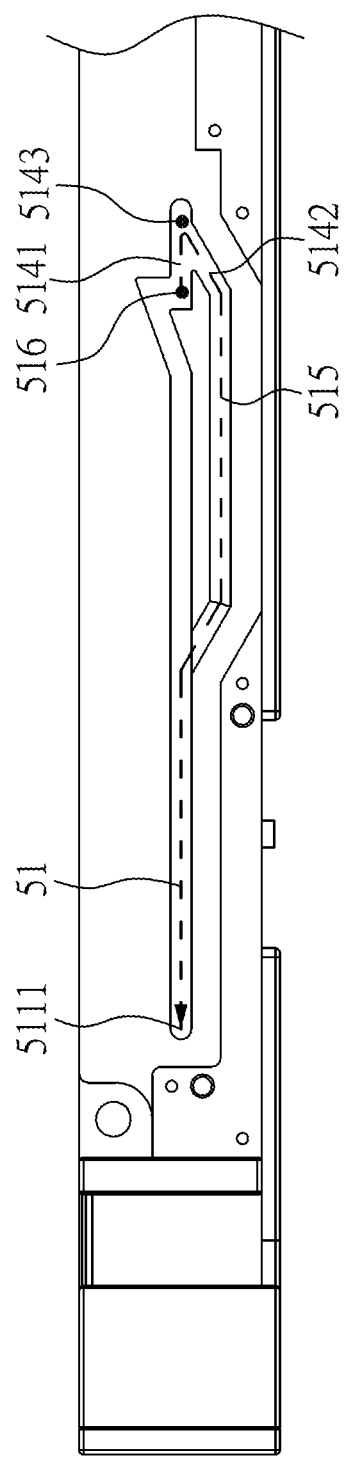
FIG. 9 is a schematic view for illustration of the sliding route by which the first slidable end of the first rod slides along the first trough to switch into the retracting state in accordance with the present invention.
Figure 10:
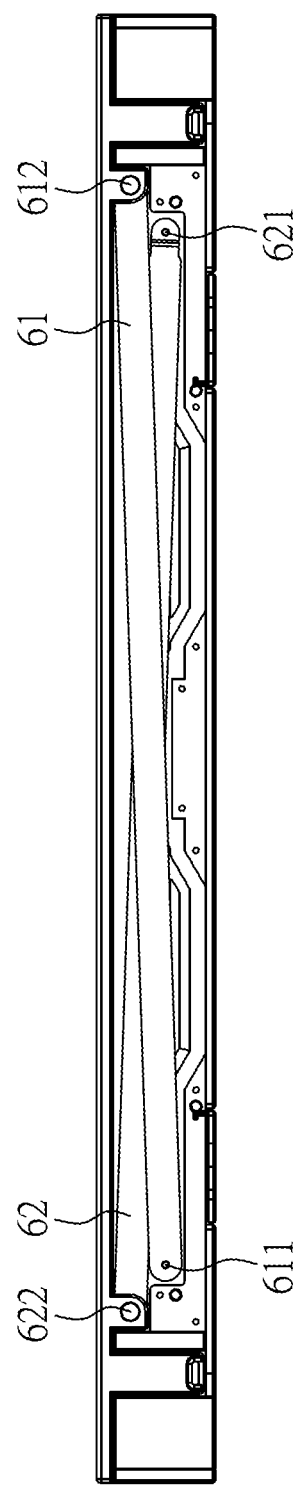
FIG. 10 is a perspective view for illustration of a retracting state of a rollable display device in accordance with the present invention.

Further, the rollable display device 1000 can be operated from the expanding state as shown in FIGS. 1 and 2 into the retracting state as shown in FIG. 4 by providing an external force to lift the cover 2 in a direction away from the base 1. Please refer to FIG. 9, which shows the sliding route of the first slidable end 611 along the first trough 51. As the sliding route of the second slidable end 621 along the second trough 52 is mirror-symmetric to that of the first slidable end 611, the same description need not be repeated. When the external force is applied to lift the cover 2 in the direction away from the base 1, the upward external force causes the first slidably end 611 to slide towards the second convex section 514 from the joint 516. Upon the first slidable end 611 slides to a turn point 5143 between the third linear segment 5141 and the fourth linear segment 5142 of the second convex section 514, the external force cannot lift the cover 2 anymore. Then, the torsion provided by the torsion spring 33 can bring the shell 31 of the rolling module 3 into rotary motion after removal of the external force. As a result, the flexible display area 43 is gradually rolled up on the shell 31, and the first slidable end 611 continues the sliding motion through the second section 515 and the first section 511 in sequence and finally stops at the terminal part 5111 of the first section 511. In the retracting operation, the junction P (as shown in FIG. 2) between the first rod 61 and the second rod 62 moves towards the base 1 until the rollable display device 1000 returns to the retracting state as shown in FIG. 10 and the display screen 4 is in the rolled state.

Moreover, the base 1 further includes two foot plates 15 symmetrically disposed under the tubular body 11 and capable of swiveling with respect to the tubular body 11. As shown in FIG. 1, when the rollable display device 1000 is in the expanding state, the foot plates 15 can be swiveled to be perpendicular to the extending direction of the tubular body 11 so as to provide additional support for the tubular body 11 and prevent the rollable display device 1000 in the expanding state from falling down due to uneven weight distribution of components. When the rollable display device 1000 is in the retracing state, the foot plates 15 can be swiveled to be parallel to the extending direction of the tubular body 11 and below the tubular body 11, as shown in FIG. 4.

Figure 11:
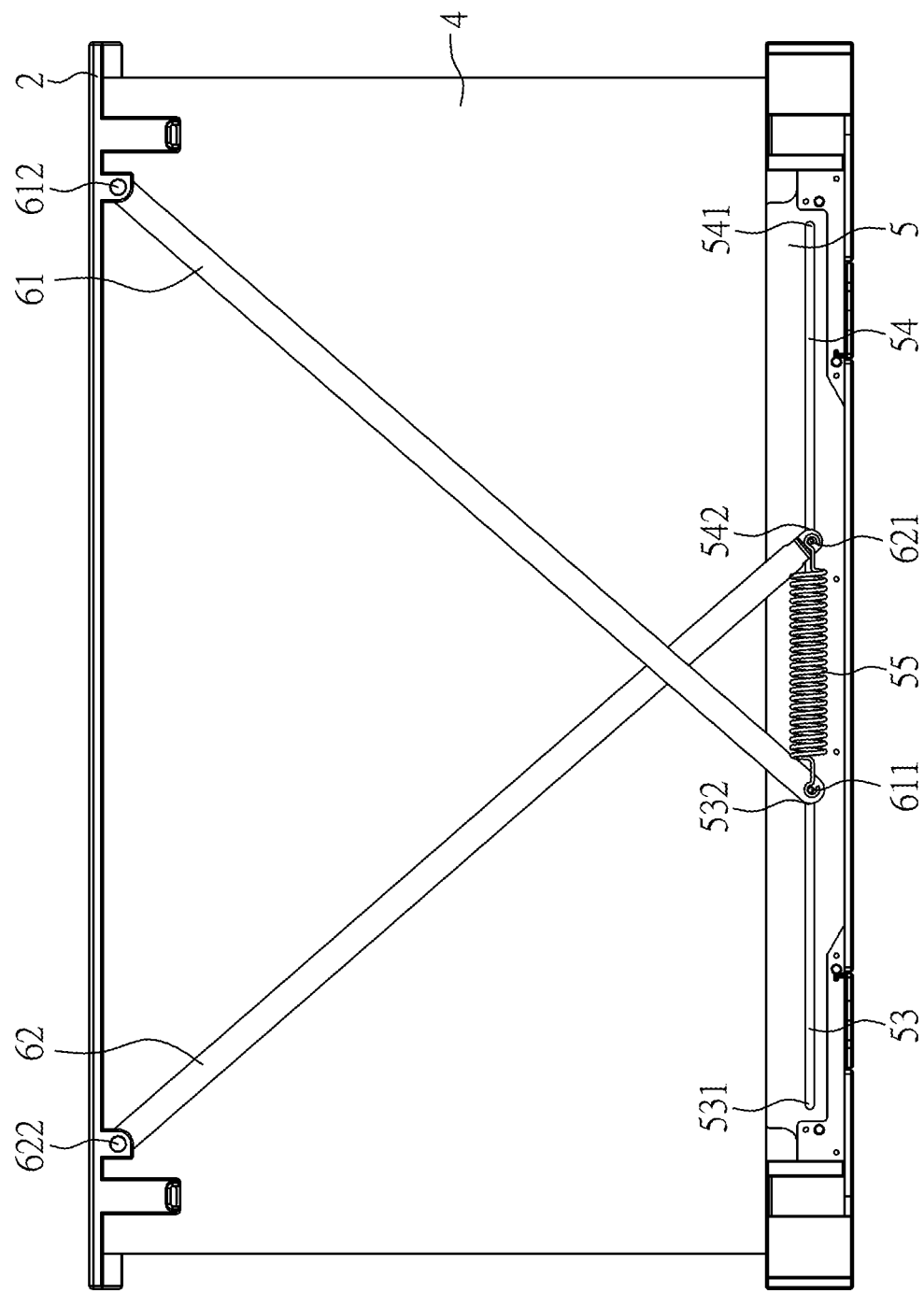
FIG. 11 is a perspective view for illustration of an expanding state of a rollable display device in accordance with another aspect of the present invention.

In accordance with another embodiment, as shown in FIG. 11, the actuating unit 5 may include a third trough 53, a fourth trough 54 and an elastic element 55 (p.s. the first trough 51 and the second trough 52 are omitted). In this embodiment, the third trough 53 and the fourth trough 54 are linear troughs, and the elastic element 55 is an extension spring. The first slidable end 611 and the second slidable end 621 are slidably disposed at the third trough 53 and the fourth trough 54, respectively, and fixed to two ends of the elastic element 55. When the rollable display device 1000 is in the retracting state, the first slidable end 611 and the second slidable end 621 are located at the first end 531 of the third trough 53 and the first end 541 of the fourth trough 54, respectively, and the elastic element 55 is in the maximum degree of stretching. In this state, the foot plates 15 of the base 1 can be folded below the tubular body 11 to be parallel to the extending direction of the tubular body 11 (as shown in FIG. 4), and hooks 151 (as shown in FIG. 2) of the foot plates 15 can be engaged with grooves 21 of the cover 2. Accordingly, the cover 2 is fastened to the base 1 so as to avoid the cover 2 to separate from the base 1 under the pulling force of the elastic element 55. When the rollable display device 1000 is switched to the expanding state as shown in FIG. 11, the foot plates 15 of the base 1 can be swiveled to remove the interlocking between the base 1 and the cover 2. Then, the pulling force provided by the elastic element 55 can drive the first slidable end 611 and the second slidable end 621 to slide towards the second end 532 of the third trough 53 and the second end 542 of the fourth trough 54 along the third trough 53 and the fourth trough 54, respectively. Accordingly, the cover 2 is forced to move apart from the base and thus brings the display screen 4 into rotation and expanding motion about the rolling module 3 until the first slidable end 611 and the second slidable end 621 stop at the second end 532 of the third trough 53 and the second end 542 of the fourth trough 54, respectively. As a result, the display screen 4 is in the expanding state.

Figure 12:
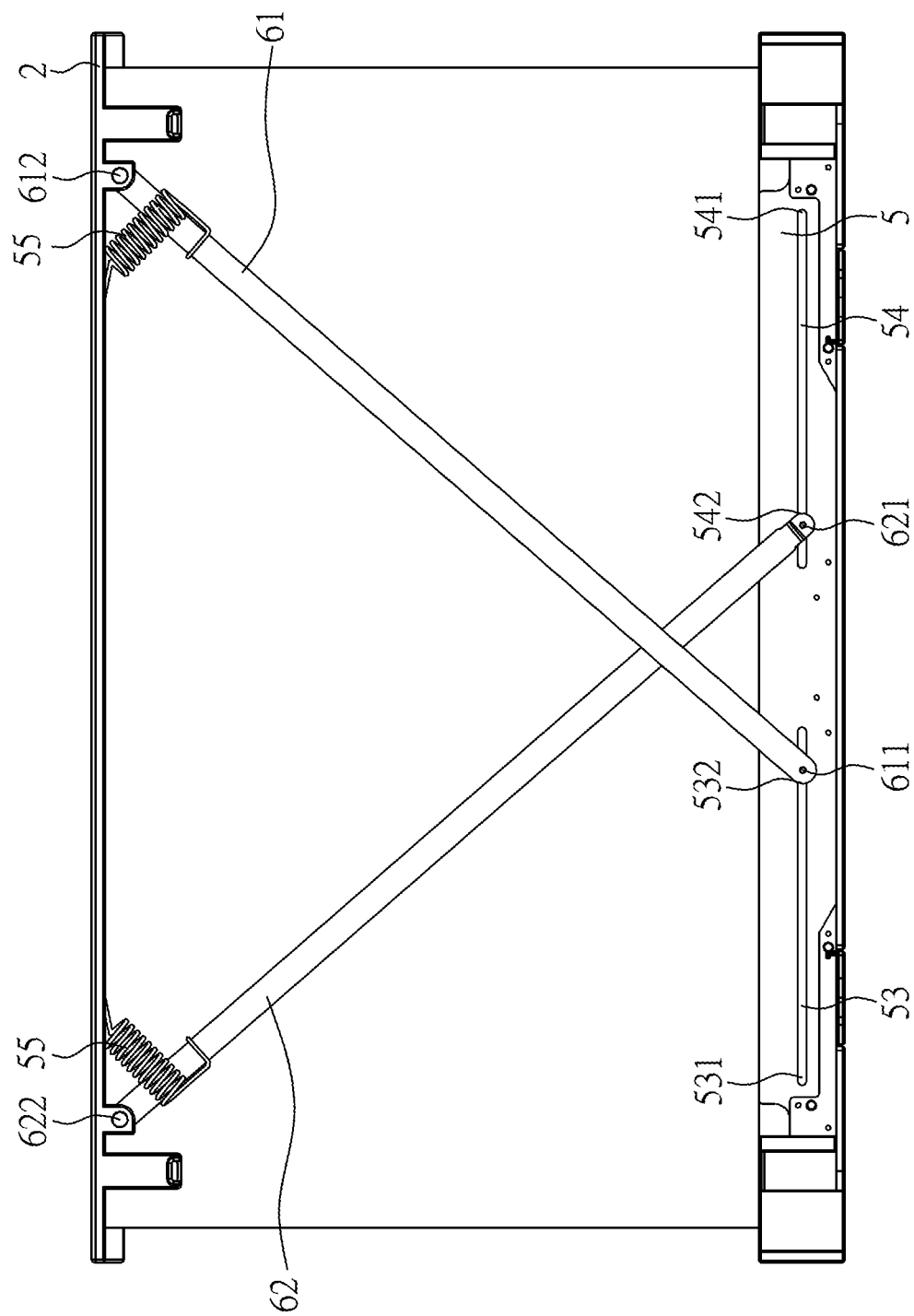
FIG. 12 is a perspective view for illustration of an expanding state of a rollable display device in accordance with yet another aspect of the present invention.

In accordance with yet another embodiment, as shown in FIG. 12, the actuating unit 5 includes a third trough 53, a fourth trough 54 and two elastic elements 55. In this embodiment, the elastic elements 55 are two torsion springs. The first slidable end 611 and the second slidable end 621 are slidably disposed at the third trough 53 and the fourth trough 54, respectively. One of the elastic elements 55 is disposed between the cover 2 and the first rod 61, whereas the other of the elastic elements 55 is disposed between the cover 2 and the second rod 62. When the rollable display device 1000 is in the retracting state, the first slidable end 611 and the second slidable end 621 are located at the first end 531 of the third trough 53 and the first end 541 of the fourth trough 54, respectively, and the elastic elements 55 are twisted to the maximum. In this state, the foot plates 15 of the base 1 can be folded below the tubular body 11 to be parallel to the extending direction of the tubular body 11 (as shown in FIG. 4), and hooks 151 (as shown in FIG. 2) of the foot plates 15 can be engaged with grooves 21 of the cover 2. Accordingly, the cover 2 is fastened to the base 1 so as to avoid the cover 2 to separate from the base 1 under torsion force of the elastic elements 55. When the rollable display device 1000 is switched to the expanding state as shown in FIG. 12, the foot plates 15 of the base 1 can be swiveled to remove the interlocking between the base 1 and the cover 2. Then, the torsion force provided by the elastic elements 55 can drive the first slidable end 611 and the second slidable end 621 to slide towards the second end 532 of the third trough 53 and the second end 542 of the fourth trough 54 along the third trough 53 and the fourth trough 54, respectively. Accordingly, the cover 2 is forced to move apart from the base and thus brings the display screen 4 into rotation and expanding motion about the rolling module 3 until the first slidable end 611 and the second slidable end 621 stop at the second end 532 of the third trough 53 and the second end 542 of the fourth trough 54, respectively. As a result, the display screen 4 is in the expanding state.

Figure 13:
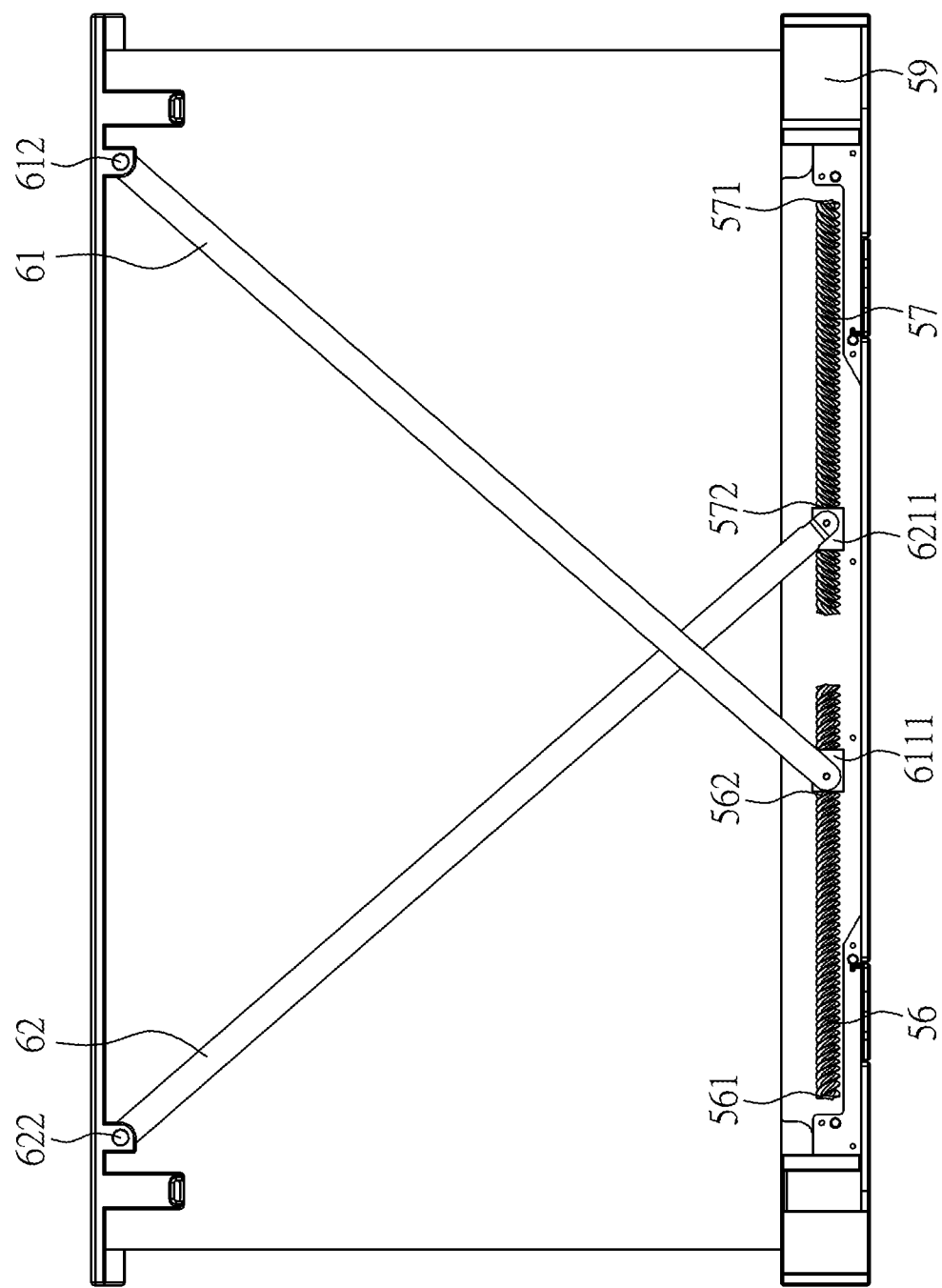
FIG. 13 is a perspective view for illustration of an expanding state of a rollable display device in accordance with further another aspect of the present invention.

In accordance with further another embodiment, as shown in FIG. 13, the actuating unit 5 includes a first threaded shaft 56, a second threaded shaft 57 and a motor 59. The motor 59 can control the rotation direction and speed of the first threaded shaft 56 and the second threaded shaft 57, and the thread direction of the first threaded shaft 56 is opposite to that of the second threaded shaft 57. The first slider 6111 of the first slidable end 611 is disposed on the first threaded shaft 56, whereas the second slider 6211 of the second slidable end 621 is disposed on the second threaded shaft 57. In switching the rollable display device 1000 into the retracting state, the first threaded shaft 56 and the second threaded shaft 57 can be driven by the motor 89 to rotate in the same direction, so that the first slider 6111 and the second slider 6211 can move towards the first end 561 of the first threaded shaft 56 and the first end 571 of the second threaded shaft 57 from the second end 562 of the first threaded shaft 56 and the second end 572 of the second threaded shaft 57, respectively. On the contrary, when the first threaded shaft 56 and the second threaded shaft 57 are driven by the motor 59 to rotate in an opposite direction, the first slider 6111 and the second slider 6211 can move towards the second end 562 of the first threaded shaft 56 and the second end 572 of the second threaded shaft 57 from the first end 561 of the first threaded shaft 56 and the first end 571 of the second threaded shaft 57, respectively, so that the rollable display device 1000 is switched from the retracting state into the expanding state.

The above examples are intended for illustrating the embodiments of the subject invention and the technical features thereof, but not for restricting the scope of protection of the subject invention. Many other possible modifications and variations can be made without departing from the spirit and scope of the invention as hereinafter claimed. The scope of the subject invention is based on the claims as appended.

What is claimed is:
1. A rollable display device, comprising:
   a base, including a tubular body and a receiving tank, wherein the tubular body has a receiving space and a slot;
   a cover, being detachably disposed on the base;
   a rolling module, being disposed within the receiving space;
   a display screen, being partially rolled on the rolling module and having one end fixed on the rolling module and the other end passing through the slot and fixed on the cover;
   an actuating unit, being disposed in the receiving tank;
   a supporting unit, having one end slidably disposed at the actuating module and the other end movable synchronously with the cover; and
   at least one foot plate, selectively interlocked with the cover;
   wherein (i) the display screen is switchable between a retracting state and an expanding state, (ii) in the retracting state, the cover contacts the base, and the display screen is rolled and received in the receiving space, and (iii) in the expanding state, the cover is separated from the base, and the other end of the display screen is located away from the base to make the display screen partially expand out of the base;

wherein the at least one foot plate permit the display screen to be switched between the retracting state and the expanding state.

2. The rollable display device of claim 1, wherein the supporting unit includes a first rod and a second rod, and the first rod has a first liftable end and a first slidable end, whereas the second rod has a second liftable end and a second slidable end, and wherein the first liftable end and the second liftable end are fixed to the cover and capable of moving with the cover, and the first slidable end and the second slidable end are slidably disposed at the actuating unit.

3. The rollable display device of claim 2, wherein the first rod and the second rod intersect with each other at a junction, and the junction between the first rod and the second rod moves away from the base when the display screen is switched into the expanding state from the retracting state.

4. The rollable display device of claim 3, wherein the base further includes a back plate, the back plate and the tubular body define the receiving tank, and the first rod and the second rod of the supporting unit are received in the receiving tank when the display screen is in the retracting state.

5. The rollable display device of claim 4, wherein the actuating unit includes a first trough and a second trough, and when the display screen is switched into the expanding state from the retracting state, the first liftable end of the first rod and the second liftable end of the second rod move away from the receiving tank synchronously with the cover, and the first slidable end and the second slidable end slide along the first trough and the second trough, respectively, and move towards each other.

6. The rollable display device of claim 5, wherein each of the first trough and the second trough has a first section, a first convex section, a second convex section and a second section, which are integrally configured into a loop, respectively, wherein the first slidable end and the second slidable end are located at the first sections of the first trough and the second trough, respectively, when the display screen is in the retracting state, and the first slidable end and the second slidable end respectively slide into the first convex section from the first section and stop at a joint between the first convex section and the second convex section when an external force is applied to lift the cover away from the base and to switch the display screen into the expanding state from the retracting state.

7. The rollable display device of claim 6, wherein the display screen is capable of being switched into the retracting state from the expanding state by applying an external force to lift the cover away from the base so that the first sildable end the second slidable end are forced to slide through the second convex section from the joint, respectively, followed by removal of the external force to make the first sildable end the second slidable end slide through the second section and the first section in sequence and stop at the first section.

8. The rollable display device of claim 7, wherein the first convex section has a linear segment and a second linear segment, whereas the second convex section has a third linear segment and a fourth linear segment, and wherein the first linear segment and the second linear segment define a first angle, the third linear segment and the fourth linear segment define a second angle, the second linear segment and the third linear segment define a third angle, and the first angle, the second angle and the third angle are 90 degrees or less.

9. The rollable display device of claim 4, wherein the rolling module includes a shell, a shaft, a torsion spring and a rotating element, and wherein the display screen is partially rolled on the shell, the shaft extends through the shell, the torsion spring and the rotating element are sleeved on the shaft, the torsion spring has one end connected to the rotating element and the other end connected to one end of the shaft, the rotating element is connected to an inner surface of the shell, so that the shell is capable of moving with the rotating element, and when an external force is applied on the cover, the shell of the rolling module is brought into rotary motion by a portion of the display screen, resulting in rotation of the rotating element, so that the torsion spring provides a torsion constantly.

10. The rollable display device of claim 9, wherein the torsion spring of the rolling module provides the torsion on the rotating element to rotate the shell when the display screen is switched from the expanding state to the retracting state, so that the display screen is rolled on the shell.

11. The rollable display device of claim 4, wherein the actuating unit includes an elastic element, a third trough and a fourth trough, and wherein the first slidable end and the second slidable ends are fixed to two end of the elastic element, the first slidable end is slidably disposed at the third trough, whereas the second slidable end is slidably disposed at the fourth trough, and the third trough and the fourth trough are linear troughs.

12. The rollable display device of claim 4, wherein the actuating unit includes a plurality of elastic elements, a third trough and a fourth trough, and wherein one of the elastic elements is disposed between the cover and the first rod, whereas another of the elastic elements is disposed between the cover and the second rod, the first slidable end is slidably disposed at the third trough, and the second slidable end is slidably disposed at the fourth trough, and the third trough and the fourth trough are linear troughs.

13. The rollable display device of claim 4, wherein the actuating unit includes a first threaded shaft and a second threaded shaft, and wherein the first slidable end has a first slider sleeved on the first threaded shaft, and the second slidable end has a second slider sleeved on the second threaded shaft.

14. A rollable display device, comprising:
a base, including a tubular body and a receiving tank, wherein the tubular body has a receiving space and a slot;
a cover, being detachably disposed on the base;
a rolling module, being disposed within the receiving space;
a display screen, being partially rolled on the rolling module and having one end fixed on the rolling module and the other end passing through the slot and fixed on the cover;
an actuating unit, having a first trough and a second trough being disposed in the receiving tank, each of the first trough and the second trough has a first section, a first convex section, a second convex section and a second section, which are integrally configured into a loop, respectively; and
a supporting unit, having a first rod and a second rod, and the first rod has a first liftable end and a first slidable end, whereas the second rod has a second liftable end and a second slidable end, and wherein the first liftable end and the second liftable end are fixed to the cover and capable of moving with the cover, and the first slidable end and the second slidable end are slidably disposed at the actuating unit;

wherein (i) the display screen is switchable between a retracting state and an expanding state, (ii) in the retracting state, the cover contacts the base, and the display screen is rolled and received in the receiving space, and (iii) in the expanding state, the cover is separated from the base, and the other end of the display screen is located away from the base to make the display screen partially expand out of the base; wherein the first slidable end and the second slidable end are located at the first sections of the first trough and the second trough, respectively, when the display screen is in the retracting state, and the first slidable end and the second slidable end respectively slide into the first convex section from the first section and stop at a joint between the first convex section and the second convex section when an external force is applied to lift the cover away from the base and to switch the display screen into the expanding state from the retracting state.

15. The rollable display device of claim 14, wherein the first rod and the second rod intersect with each other at a junction, and the junction between the first rod and the second rod moves away from the base when the display screen is switched into the expanding state from the retracting state.

16. The rollable display device of claim 15, wherein the base further includes a back plate, the back plate and the tubular body define the receiving tank, and the first rod and the second rod of the supporting unit are received in the receiving tank when the display screen is in the retracting state.

17. The rollable display device of claim 16, wherein the display screen is capable of being switched into the retracting state from the expanding state by applying an external force to lift the cover away from the base so that the first sildable end and the second slidable end are forced to slide through the second convex section from the joint, respectively, followed by removal of the external force to make the first sildable end and the second slidable end slide through the second section and the first section in sequence and stop at the first section.

18. The rollable display device of claim 17, wherein the first convex section has a linear segment and a second linear segment, whereas the second convex section has a third linear segment and a fourth linear segment, and wherein the first linear segment and the second linear segment define a first angle, the third linear segment and the fourth linear segment define a second angle, the second linear segment and the third linear segment define a third angle, and the first angle, the second angle and the third angle are 90 degrees or less.

19. The rollable display device of claim 18, wherein the rolling module includes a shell, a shaft, a torsion spring and a rotating element, and wherein the display screen is partially rolled on the shell, the shaft extends through the shell, the torsion spring and the rotating element are sleeved on the shaft, the torsion spring has one end connected to the rotating element and the other end connected to one end of the shaft, the rotating element is connected to an inner surface of the shell, so that the shell is capable of moving with the rotating element, and when an external force is applied on the cover, the shell of the rolling module is brought into rotary motion by a portion of the display screen, resulting in rotation of the rotating element, so that the torsion spring provides a torsion constantly, and wherein the torsion spring provides the torsion on the rotating element to rotate the shell when the display screen is switched from the expanding state to the retracting state, so that the display screen is rolled on the shell.

* * * * *